TELEVISION PICTURE RECORDING AND REPLAY SYSTEM

Filed Aug. 4, 1967

Inventor
Adrianus Korpel
By Hugh H. Drake
Attorney

United States Patent Office 3,534,166
Patented Oct. 13, 1970

3,534,166

TELEVISION PICTURE RECORDING AND REPLAY SYSTEM

Adrianus Korpel, Prospect Heights, Ill., assignor to Zenith Radio Corporation, Chicago, Ill., a corporation of Delaware Filed Aug. 4, 1967, Ser. No. 658,447
Int. Cl. H04n 5/86
U.S. Cl. 178—6.7 6 Claims

ABSTRACT OF THE DISCLOSURE

A television receiver develops video signals from composite television signals and displays successive frames of a television picture; the receiver is selectively controllable to develop also a picture representative of other electric signals. A recording medium exemplified by photographic film is capable of bearing a succession of images like in a movie film and the film is moved past an exposure or viewing region. A collimated beam of optical radiation such as light from a laser is modulated in response to video signals from the receiver. The beam is scanned over the exposure region to define image lines and movement of the medium results in the development of a succession of image fields in correspondence with successive fields of the television picture information. Also included is a detector which is disposed to received a portion of the radiation educed from the film and to feed corresponding electric signals to the television receiver. Through selective control, the system may be used either to record the received video signal information on the film for later use or to pick up the recorded information on the film and cause it to be displayed by the television receiver.

Figure 1:
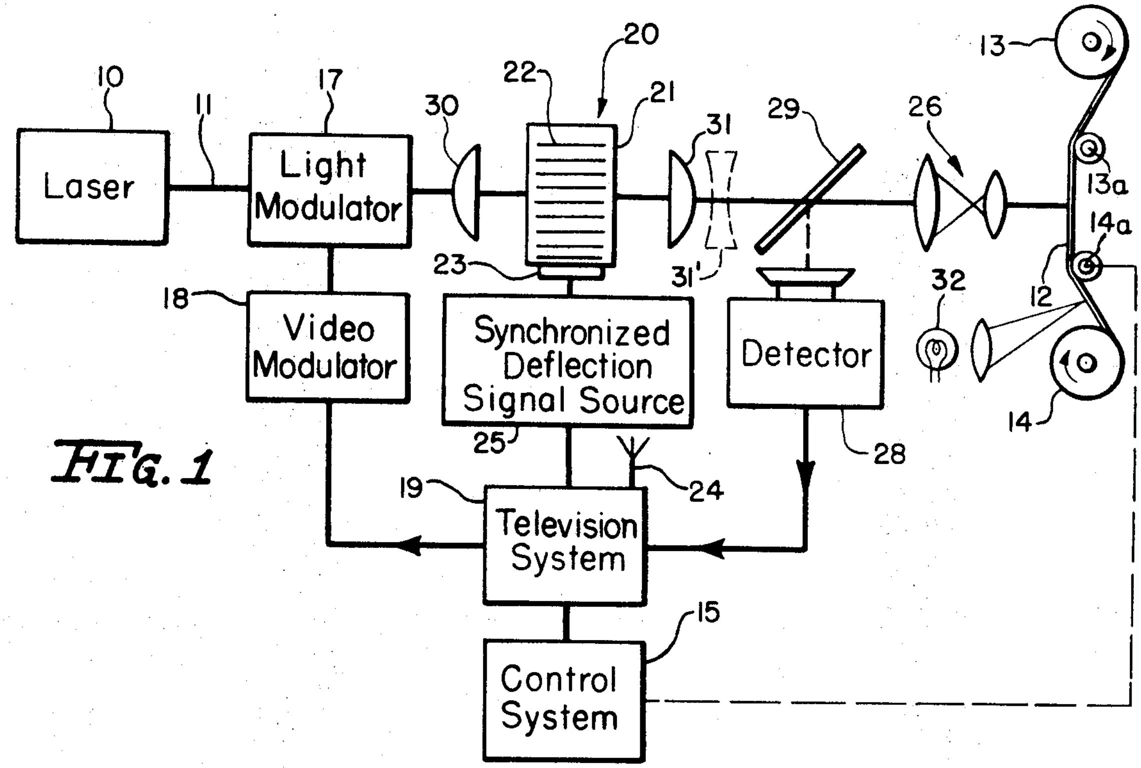

The present invention pertains to video systems. More particularly, it relates to systems for recording video information and/or picking up that information from a recording and causing it to be displayed.

In the conventional motion picture system, successive frames of an image are recorded upon a photographic film, and light is projected through those frames in sequence in order to display the recorded image information. The television receiver represents another familiar type of image display; images are reconstituted from video signals transmitted over the air or by wired connection from a television studio. At the studio, the video signals may be developed "live" by a television camera or they may be derived from a recording.

A typical video recording system utilizes magnetic tape as the storage element and is exceedingly complex and expensive. More recently, attention has been given to a desire for the development of a video recording system suitable for use in the home so that a viewer might record a given program for replay on his television receiver at a later time. Alternatively, the viewer might purchase, commercially prepared recordings for use in conjunction with the system and his own television receiver and, still further, the viewer might also make use of a portable television camera to make his own recordings. However, all such schemes revealed to date remain quite costly and require the use of sophisticated techniques. In particular, they require comparatively large quantities of the magnetic recording medium.

It is a general object of the present invention to provide a new and improved video recording and play-back-system of the foregoing character which avoids or reduces the aforenoted disadvantages.

A more particular object of the present invention is to provide a video recording and/or play-back system which is sufficiently uncomplicated to be capable of being produced at a comparatively lower cost.

A specific object of the present invention is to provide a new and improved video recording and play-back system which requires a significantly lessened amount of recording medium.

Another object of the present invention is to provide a new and improved video recording and/or play-back system of such character as to retain the flexibility to the user mentioned herebefore.

A video recording and play-back system, in accordance with the invention, comprises a television receiver responsive to a composite television signal, having video and synchronizing signals occurring in a series of field intervals individually comprising a multiplicity of line intervals, for displaying a corresponding series of image fields composed of parallel image lines. There is a source for supplying such a composite television signal to the receiver. Means are provided for developing a collimated beam of coherent optical radiation directed along a given beam path together with means associated with that path and coupled to the receiver for deriving and for amplitude modulating the beam with the video and synchronizing signals. Other means associated with the path and coupled to the receiver effect repetitive deflection of the beam laterally of the path in phase synchronism with the line intervals of the television signal. There is a recording medium capable of recording images in response to the scanning of image areas thereof by incident optical radiation. Driving means are provided for continuously moving that medium across the beam path transverse to the direction of beam deflection. Still other means are provided for imaging the modulated and deflected beam onto the moving medium to record thereon the aforesaid series of image fields of parallel image lines. A detector, responsive to the scanning of the recorded image fields on the medium by a constant amplitude beam of coherent radiation deflected repetitively at the same deflection rate as the modulated beam, develops a composite signal. Finally, there are control means for selectively coupling the aforesaid signal source or the detector to the receiver for applying a composite television signal thereto and for effectively disabling the modulating means in operating intervals in which the detector is coupled to the receiver.

Figures 2, 3, 4:
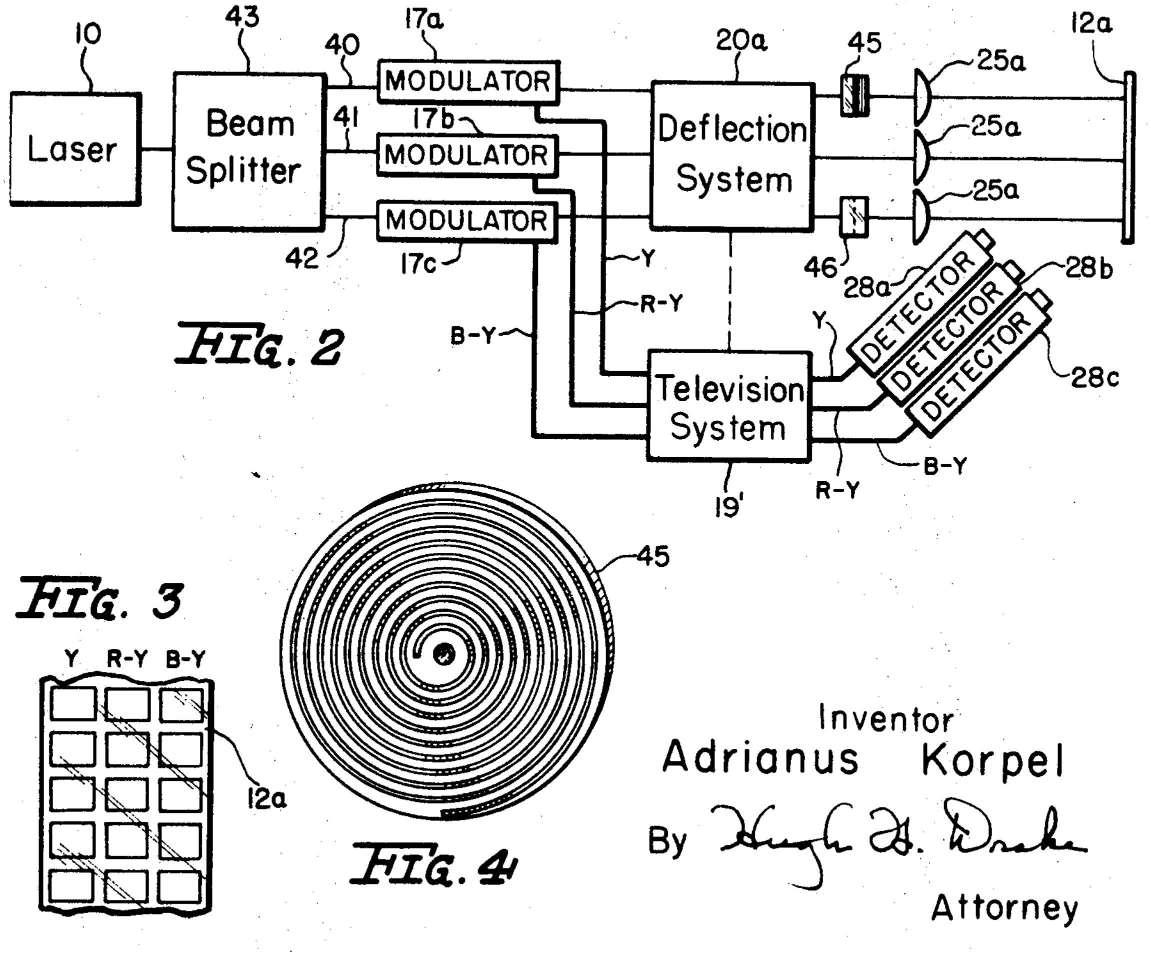

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements and in which:

FIG. 1 is a partially schematic block diagram depicting one embodiment of the present invention;

FIG. 2 schematically illustrates an alternative embodiment of the present invention;

FIG. 3 is a fragmentary plan view of a strip of recording medium utilized in the FIG. 2 embodiment; and FIG. 4 is a perspective view of an alternative form of a recording medium which may be utilized in connection with the systems of FIGS. 1 and 2.

The system illustrated in FIG. 1 includes a source of collimated, high-intensitey optical radiation as is exemplified by that from a laser. The term "optical" is used here to denote that type of radiation which is capable of being acted upon, e.g., focused or magnified, by typical optical components such as lenses; included is radiation in the infrared, visible and ultraviolet regions of the spectrum. It is convenient for illustration to utilize visible light, and the description hereafter will proceed on that basis. As shown, the light from laser 10 is projected along a beam path 11 through a series of components to a recording medium 12. For reasons which will become more apparent subsequently, the recording medium is in the form of an elongated strip or film pulled at a constant speed during normal operation from a supply reel 13 over an idler wheel 13a and supplied to a take-up reel by a capstan 14a in turn driven by a control system 15. Take-up reel 14 is driven in the usual manner of a tape recorder or movie projector to accept strip 12 as it is fed thereto under the control of capstan 14a; as also is conventional, a pressure wheel (not shown) may be disposed opposite capstan 14a.

Disposed on path 11 beyond laser 10 is a light modulator 17 for intensity modulating light passing therethrough. A variety of arrangements are known which may be used for this purpose, including systems taking advantage of the intensity-control effect of electro-optic materials, polarizers and variable interferometers. A particularly suitable light modulator is that disclosed in my copending application Ser. No. 600,430, filed Dec. 9, 1966 and assigned to the assignee of the present application. Also suitable are the somewhat similar light modulators disclosed in the copending applications of Robert Adler, Ser. No. 388,589, filed Aug. 10, 1964, now Pat. No. 3,431,504, issued Mar. 4, 1969, and Ser. No. 476,797, filed Aug. 3, 1965, both assigned to the assignee of the present application.

In the Adler applications, a beam of laser light is modulated with intelligence information by propagating sound waves representative of the modulation across the light path at an angle appropriate to cause diffraction of the light by the sound wavefronts. In this manner, the diffracted light is modulated in intensity in accordance with the video signals modulated upon the sound energy. To obtain good high-frequency response, the Adler approaches utilize a very narrow beam of light.

In my copending application sound waves representative of video modulation are similarly propagated across the light beam in a manner to cause diffraction of the light. The relative intensity of successive groups of the sound waves represent the shade values of successive elements of the video picture and a plurality of such groups simultaneously intercept the light beam. Downstream of those sound waves is another, preferably similar, element for deflecting the video modulated beam by guiding across the light beam acoustic waves which interact with the light to diffract the beam at an angular rate corresponding to the angular rate of the sound waves in the video modulator as seen from this element; as will be explained further, this element is embodied herein as deflection system 20. The system of my prior case also includes means for imaging the intensity variations in the modulator upon a plane where a visual image is developed; herein, this component takes the form of a telescope 26, although experience has shown that a simple spherical lens may be used equally as well.

When using the light-sound interaction approach of these prior applications, the sound waves typically are modulated with a high-frequency carrier upon which the video information has been amplitude modulated. That high-frequency carrier typically has a frequency of 40 megahertz and the sound waves are generated by a pizeoelectric transducer in acoustical communication with a body of water through which the sound waves are propagated in their traversal of the light beam. To the end, then, of driving modulator 17 of FIG. 1, assuming it to be constructed in accordance with the disclosure of my aforesaid prior application, driving signals are fed thereto from a video modulator 18. The latter constitutes a source of high-frequency signal or carrier and an amplitude modulator by means of which video signals derived from a television receiving system 19 are modulated upon the carrier.

Next in the system of FIG. 1 beyond modulator 17 is light deflection system 20 and it similarly may take any of a number of known forms. For example, a mechanical approach is feasible in which mirrors are caused to rotate or scan by galvanometer-like driving elements under the control of scanning signals derived from television system 19. However, the system of FIG. 1 preferably employs a light-beam deflection element of the kind described in my prior application Ser. No. 600,430. That system again utilizes diffractive interaction between sound waves and the light beam. The angle by which the light beam is diffracted is proportional to the frequency of the sound waves, and, by repetitively scanning the sound frequency through a range of frequencies, the light beam is caused to scan back and forth a controlled amount in the plane of diffraction. Thus, as here embodied, system 20 includes a container 21 enclosing a medium such as water in which sound or acoustic waves 22 are caused to propagate by a transducer 23. While the latter may be simply a flat piezoelectric crystal, my prior case fully explains a more complex transducer structure which enables an increased range of scan.

For illustration of the light-sound interaction region in deflection system 20, container 21 has been shown in FIG. 1 as if the sound waves propagated in a direction parallel to strip 12. As actually employed, however, system 20 scans the light beam in a direction at right angles to the movement of strip 12, and to that end the sound waves propagate in a direction also at right angles to the strip movement. That is, with vertical movement of strip 12, deflection system 20 effects horizontal scanning of the light beam. By moving strip 12 vertically at a constant rate while system 20 scans the light beam horizontally, a complete image raster is defined.

As explained in application Ser. No. 600,430, the sound beam launched by transducer 23 is comparatively wide in the direction of light travel and of relatively narrow height in the direction perpendicular to the direction of horizontal deflection. For efficient sound deflection, it is desired that the light beam entering deflector 20 also be of narrow height but wide in the direction of sound propagation. To this end, a cylinder lens 30 disposed in the path of light focuses the beam to a wedge-shaped cross-over within the sound path in deflector 20. Correspondingly, a cylinder lens 31 acts upon the beam emerging from deflector 23 to restore the beam to a circular cross-section. Moreover, as described in application Ser. No. 476,797, the use of an incoming light beam wide in the direction of sound propagation together with a linearly changing sweep signal from unit 25 results in action by deflector 20 as if it too were a cylinder lens.

Television system 19 in this instance is an entirely conventional television receiver. Broadcast radio-frequency composite television signals intercepted by an antenna 24 thus are amplified and converted to intermediate frequency signals for further amplification after which in the usual manner both video and audio signals are detected. Of course, the audio signals are amplified and fed to a loud speaker and the video signals are likewise amplified and utilized to drive the electron gun of a cathode-ray tube. Television system 19 also includes the usual means for separating out synchronizing signals and utilizing them to control the scanning of an image raster on the cathode-ray tube faceplate, the ultimate result being the production on that faceplate of a television picture. Such a television receiver is also capable of responding to composite television signals received by way of a wired connection such as a coaxial cable rather than over the air so as to be intercepted by antenna 24. The difference in the two modes of operation is simply the manner in which the program signal is applied to the receiver.

The television system further includes connections and conventional switching mechanism for selectively controlling its mode of operation to enable its use as a portion of a video recorder and/or as a portion of a recorded-video reproducer. To effect the recording of video, the video and synchronizing signals detected within the television receiver in the usual manner and derived from the output of the video amplifier are fed to video modulator 18 instead of or in addition to being supplied to the picture tube of the receiver. Consequently, by virtue of the action of video modulator 18 and light modulator 17, those video and synchronizing signals derived from television system 19 are impressed upon the beam from laser 10 in the form of intensity modulation of the light.

At the same time, deflection system 20 is driven by a synchronized deflection signal source 25 which in turn is controlled by the conventional horizontal scanning signal developed in and derived from the television receiver of system 19. Typically, the horizontal scanning signal has a repetition rate of 15,750 hertz. Utilizing the type of deflector element mentioned in which sound waves are propagated across the light beam, the sound frequency in one development system is scanned through a frequency range $\Delta f$ of 19 to 35 megahertz. In that system, some 200 resolvable spots are developed in the horizontal direction, the number of resolvable spots N being equal to $\tau\Delta f$, where $\tau$ in this case is the transit time of the sound past the light beam. In achieving such operation, unit 25 constitutes a source of high-frequency carrier signal in the 19–35 megahertz range which in turn is frequency modulated repetitively in a cycle that is timed or controlled by the horizontal scanning signal from system 19 so as to be repeatedly scanned over that frequency range required to achieve the desired horizontal scansions of the light beam across strip 12 in synchronism with line-trace intervals of the composite television signal supplied to receiver 19.

With the light beam thus modulated with video and sync signals from system 19 and deflected by system 20 at the horizontal or line rate of the composite video signal, the beam as seen in an imaginary image plane across path 11 just beyond deflection system 20 constitutes in each trace of its scan cycle one image line of a television-type display of the video picture. The modulated beam, which is subjected to only horizontal deflection in deflection system 20, after emerging from the deflection system is focused upon the plane defined by recording medium 12. This may be accomplished by means of a simple spherical lens or, as indicated in the drawing, by telescope 26 such that an extremely small picture or image of a video line appears on the region of recording medium 12 that is intercepted by the light beam. Because of the coherence of laser light substantially all of the light from laser source 10 is concentrated into this small image area. As a consequence, the available brightness or the light flux per unit area on the film is enormous.

For the system thus utilizing 200 resolvable spots in the horizontal direction and incorporating synchronized movement of strip 12 so that the successively scanned horizontal lines are disposed seriatim along the length of strip 12 with each one displaced from the next defining an image raster, the size of that raster in one exemplary arrangement is only 0.020 inch by 0.015 inch. Consequently, each resolvable spot or image element has a diameter of only 0.0001 inch or 2.5 microns. It can be shown that the ultimate limit of resolution is determined by the wavelength of the optical radiation utilized. Employing the same system arrangement described with an even smaller width, a spot size of one micron (one twenty-five thousandths of an inch) has been obtained with red light. It will be observed that such a small spot size is close to the theoretical limit of one-half the wavelength of the light.

As a more detailed illustration of an arrangement according to FIG. 1, another developmental system exhibiting 200 resolvable spots at the deflector produced a raster on strip 12 having a horizontal dimension or width of 1.6 mm. and a height of 1.2 mm. That height is three-fourths the width and corresponds to a movement of a point on the strip by that vertical distance in one-sixtieth of a second, the time interval of one field of a conventional television picture. Cylinder lenses 30 and 31 are each spaced one focal length from the center of the sound path in deflector 20. In place of telescope 26 a simple spherical lens of 18.75 cm. focal length was employed and strip 12 was positioned at the focal plane of the lens.

Using in this illustration a frequency sweep from unit 25 of twenty megahertz and light from a helium-neon laser of 6328 Angstrom wavelength, the horizontal scan angle of the beam emerging from deflector 20 is 8.5 milliradians and lens 26 forms a picture on film 12 of 1.6 mm. wide.

In the system of FIG. 1 as herein principally embodied, recording medium 12 is a strip or ribbon of photographic film sensitive to the intense light from laser 10 for developing an image pattern of light and dark areas corresponding to the elemental contrast variations in the video information being recorded. The aforementioned extremely-high light intensity enables the use of photographic film material of very low sensitivity and the latter in turn is a characteristic of the fine-grain emulsions needed to record the detail in such a miniaturized picture. For example, Kodak type 649F spectrographic film, capable of resolving 2000 lines per millimeter which is about the theoretical limit of resolution obtainable with the red light of a conventional helium-neon laser, has the very low sensitivity of only ASA 0.01, or some 10,000 times less than that of a simple camera film. Yet, it may be shown that only about three microwatts of light power is necessary to effect the recording of a complete 400×300 micron picture in 1/30 of a second.

By reason of the foregoing, it is contemplated in one alternative to take advantage of the low-sensitivity requirement to utilize well-known photographic emulsions for the recording medium of a kind which require no development by a wet process. In one example the recording was made on oscillograph paper, being exposed with red laser light and developed by white light by means of the light source-lens combination 32 of FIG. 1.

In the conventional television transmission system utilized in the United States, the horizontal scanning lines are interlaced in the vertical direction so that interlaced halves of a total picture frame are produced in successive scanning fields. As a consequence, two successive complete fields of scanning lines must be recorded on recording medium 12 in order to define one complete picture frame or total image. The next two successive fields developed upon recording medium 12 represent the following picture frame. Control system 15 drives capstan **14*a* at a constant rate effecting continuous movement of recording medium 12 to record a succession of image lines collectively defining the successive image fields represented by the received program signal. Preferably, as indicated above, the recorded information includes not only the actual picture content but also the horizontal synchronization signals at the end of each line and the vertical synchronization signals at the end of each frame. All of this information is available in the output of the picture detector or video amplifier which may be used as the video source for modulator 18**.

Once the succession of frame-defining images have been recorded upon medium 12, and developed if necessary, the system of FIG. 1 may be employed to display or play back the recorded video information by reading the film record to develop a composite television signal for use by the same receiver of television system 19. To this end, a photosensitive detector 28 is disposed to focus generally upon and receive a portion of the light educed from the recording medium as the laser beam, now performing a reading function, is caused to scan the medium while the latter is moved or advanced in time relation to the scanning sequence; in this playback mode, the scanning laser beam is, of course, unmodulated. As shown, detector 28 receives light reflected from strip 12; alternatively, the detector may be disposed on the side of the strip opposite laser 10 to receive and detect variations in light transmitted through the scanned image region of the strip. Where detector 28 is to receive light reflected from recording medium 12, a partial reflector 29 is disposed in beam path 11 as shown in FIG. 1. Reflector 29 transmits most of the light in the scanning beam along path 11 toward recording medium 12 but a minor portion of the light in the laser beam reflected back along path 11 from the image recorded on film 12 is directed laterally from path 11 into detector 28. Detector 28 responds to variations in the reflected radiation to develop an electrical signal which instantaneously is representative of the video information recorded on the portion of film 12 upon which the light beam is incident. Consequently, as the recording on film strip 12 is read by the successive line scansions of the laser beam, the signal developed by detector 28 represents the recorded video information and this signal is fed into the television receiver of system 19 as a composite video signal having picture as well as synchronizing information.

It should be noted in passing that the laser beam, when recording information on film strip 12, is relatively broad so that a plurality of groups of sound waves simultaneously intercept the beam in modulator 17. For reading the film, however, the beam should be relatively narrow to represent a single picture element and, while this may be accommodated by adjustment of lens 31 and telescope 26, it is much more feasible to insert a separate, negative cylinder lens in the optical path during playback. Accordingly, the system of FIG. 1 includes such a negative lens 31′, shown in broken-line construction to connote that it is in place only during playback. If its properties match the remainder of the optical system, it is not necessary to refocus or adjust the optical system for playback; lens 31′ is simply put in position and film 12, having been developed and rewound, is scanned or read by the laser beam.

In the television receiver the video signal from detector 28 is utilized in the usual way with its synchronization information fed to the receiver synchronizing circuitry and the picture information supplied to the electron gun of the cathode-ray tube so that the latter develops on its faceplate a television picture in the same manner as described for the case of video signals derived by way of a television broadcast intercepted by antenna 21. To accomplish this result it is convenient to feed the composite video signal to the video detector load to be translated through the video amplifier to the cathode-ray tube while the synchronizing components thereof are separated and fed to their circuitry in conventional manner.

In this playback mode of operation, wherein the overall system functions to pick up and reproduce a previously recorded signal, video modulator 18 is in effect disabled by control system 15 so that light modulator 17 is inactive and light from laser 10 passes unmodulated through the light modulator to deflection system 20. That is, modulator 17 is either disabled completely, serving passively to translate the light beam without significant change, or is fed with an unmodulated carrier with an amplitude selected to pass the light beam with an intensity level consistent with the requirements for reading medium 12. Another function of control system 15 is to disable the application of the electrical signals from detector 28 to television system 19 when the system of FIG. 1 is utilized to record an image and conversely to disable the antenna input to the television system during playback intervals. The control functions of system 15, in selectively enabling and disabling video modulator 18 and selectively supporting signals from antenna 24 and detector 28 to television system 19, are simple switch actuations which, for simplicity, are not shown in the drawing. Generally, they are effected by manipulating one or more switches of a control panel.

For proper playback, it is preferred that a direct relation ship exist between the horizontal scan and the vertical motion of the recording medium to avoid line crawl. Several techniques useful to this end are disclosed in the copending application of Robert Adler, Ser. No. 682,455, filled Nov. 13, 1967 and assigned to the same assignee as the present application. A basic approach is to select the movement speed of medium 12 during recording so that the adjacent lines fuse; on playback, it then is not highly critical that the scanning beam exactly follows the center of each recorded line. In that case, the horizontal scanning oscillator may be free-running on playback.

Nevertheless, the vertical movement speed of strip 12 on playback must be correlated with the vertical scan rate of video signal. To this end, the vertical sync pulses in the video signal are also recorded as stated above. The information from those pulses may be used on playback in a servo-loop circuit to maintain proper vertical speed as controlled by capstan **14*a*. For example, the recorded vertical sync pulse information may be multipled to the horizontal rate and a comparison between the actual horizontal rate and the multiplied vertical rate may develop an error signal for control of the vertical speed to insure the requisite number of horizontal lines per field. Other sophisticated techniques enabling greater precision in controlling the movement of film 12** are disclosed in the aforementioned Adler application.

Thus, the system of FIG. 1 represents a complete video recording and reproducing system which utilizes the same television receiver for conventional viewing of a broadcast television program and as an element in both the video recording and subsequent reproducing. Moreover, either or both of the recording and reproducing portions of the system may be employed separately, independent of the rest of the apparatus. That is, only a video signal and deflection-system synchronizing signals are necessary in order to provide a complete and workable video film recorder. On the other hand, for film reading and reproduction, modulators 17 and 18 may be omitted, and the remainder of the system can be so used to read and reproduce a film. Nevertheless, the most attractive arrangement is that shown which constitutes a complete video receiving, recording and reproducing system. Of course, for home-entertainment and most commercial purposes the system illustrated may be augmented by audio apparatus to record a sound track, either optically or magnetically, along one edge of recording medium 12 in a manner which may be identical to one of the methods presently utilized conventionally to record the sound track of a motion picture.

As another alternative of recording medium suitable in practicing the invention, techniques are known in which light energy representative of an image is caused to form surface deformations of a recording medium. Consequently, a heat-sensitive material such as one of a thermo-plastics may be used as a recording medium in which case the formation of the image is in response to the heat energy in the light beam as contrasted with the more typical photographic optical response. This approach requires that the video be amplitude modulated on a carrier that has an amplitude level selected to create a reference value of deformation in the medium in the absence of visible contrast and a phase-discrimination system is used in deriving an electrical signal through the reading of the record during playback. When the surface of the recording medium has been deformed in response to intensity variations of the recording beam, corresponding to contrast variations of the recording beam, corresponding to contrast variations of the different picture elements over the image area, the reflected (or transmitted) light during playback is modulated in phase by the image-defining surface. Different points on the recording medium are of correspondingly different elevations so that the educed light arriving at a detector 28 travels different distances from different points on the image, and this results in the phase modulation of the light at the image is scanned from one point to the next in reading the recording. Consequently, when the recording process is of that character, detector 28 may be in the form of a phase discriminator instead of being amplitude-sensitive.

Still other recording mediums exhibit a refractive index subject to change in response to light impingement. Utilizing a recording medium of that characteristic during the reproducing mode, light from the scanning beam transmitted through the recording medium is changed in phase in response to the localized index of refraction at any particular point. In that case, detector 28 is disposed to respond to the light so transmitted and again is of the phase-discrimination type.

Further to the variety of recording mediums which may be utilized, the use of the same laser for both recording and reproducing results generally in an excess of available light for the reproduction mode. Advantage may be taken of this condition by recording the images with violet or ultraviolet light, for which very sensitive recording mediums are known, and then utilizing red light for reproduction. To this end, lasers are known which are capable of being changed from the emission of light of one color to that another by the substitution of filters within the laser cavity. Different deflection sensitivity is compensated for by optical or electrical elements in this alternative.

For compactness and cost saving in a complete system, it is usually desired to use a single laser for both recording and playback, although separate lasers may be used. As mentioned above, the amount of laser beam power required or desired is generally much less on playback than for recording and, particularly for some of the not-permanently-fixed records, it is necessary that the beam power for playback be substantially reduced. To do this with a single laser, either a laser is selected which has an adjustable power output or an attenuator is inserted in the light beam path during playback. The latter need be only a filter, but it can also take other known forms. For example, the beam from a laser usually is linearly polarized. Consequently, a polarized plate can be rotated in the path selectively to control the amount of light translated through the system to strip 12. As another alternative, since modulator 17 need not be used as such during playback it then can be driven with a fixed-level signal to reduce the amount of light translated onto strip 12; as explained in my aforesaid prior application, the action of the light-sound-interaction-type modulator is to diffract a portion of the incoming light along a different path and a fixed amount of such diffraction thus can be used to select a desired beam intensity at strip 12.

FIG. 2 illustrates the incorporation of the principles described in a color television system. While applicable in the same way to a two-color system, as illustrated in FIG. 2 the arrangement is directed toward the present day tri-color television system adopted in the United States. The conventional present-day color television receiver included in television system 19′ responds to received broadcast programs to develop three video signals in the form of a luminance signal Y and two color-difference signals respectively denoted R–Y and B–Y. Correspondingly, the arrangement of FIG. 2 includes three light modulators **17*a*, 17*b* and 17*c*, one for each of the three-mentioned video signals and disposed respectively in paths 40, 41 and 42 each defining the course of a respective light beam of the kind previously described. Modulators 17*a–c* likewise may each be of the same kind described above with respect to modulator 17**.

If desired, the light beams in paths 40–42 may be developed by three corresponding lasers. As illustrated, however, a beam splitter 43 develops the three beams fed to the modulators form a single beam produced by laser 10. While such a beam splitter may take various known forms, in a simple version it is composed of mirrors (or prisms) stacked at angles of 45° to the incoming beam path, with the incoming single light beam being partially transmitted through one of the mirrors and partially reflected toward the second mirror. At that second mirror, a portion of the beam is reflected in a direction parallel to the light transmitted by the first mirror and another portion is transmitted through the second mirror to a third mirror which in turn reflects that latter portion in a direction parallel to the other two parallel components.

With paths 40, 41 and 42 thus being parallel and spaced apart in the plane of the drawing, and the deflection element in deflection system **20*a* being of the light-sound interaction type discussed above, the propagating sound waves in the deflector preferably travel in a direction normal to the plane of the drawing so that the three different beams are acted upon simultaneously by the same sound wavefront. Thereafter, the two outside beams are deflected individually by prisms 45 and 46 so as to fall on different tracks along medium 12*a*** than the track created by the central one of the three beams.

Following deflection system **20*a* and prisms 45 and 46, the three light beams are projected to and focused upon recording medium 12*a* by convergent lens systems 25*a* which operate the same as telescope 26 except that they individually image the three beams in each of paths 40–42**. In this manner, each of the individually modulated and commonly-deflected beams describes its own separate image raster upon an individual region of the recording medium so that the three different rasters simultaneously developed are spaced across the width of the recording medium as illustrated in FIG. 3.

Lens systems **15*a* and deflection system 10*a*** are depicted in simplified form in FIG. 2. It is to be understood, however, that they may be individually like the corresponding elements described with respect to FIG. 1. Moreover, each of the three rasters by itself is formed in the same manner as the single raster described with respect to the system of FIG. 1. That is, utilizing a photosensitive film as the recording medium, the result is the production of a series of three successions of image frames so that the resulting recording would look very much like a single film bearing three motion pictures disposed generally side-by-side. While the three generally side-by-side images produced by the respective three beams collectively represent a tri-color signal, they individually are recorded in monochrome as developed in the illustrated case by light from the very same source.

Analogous to the FIG. 1 system but adapted to the development of the three different color-representative video signals, the system of FIG. 2 includes a corresponding set of three detectors **28*a*, 28*b* and 28*c* each having their field of view generally focused upon and limited to be responsive to the light reflected from the image region corresponding to a respective one of the three images disposed across the width of recording medium 12*a*. Each detector develops its respective video-representative electrical signal and these are fed back into the appropriate stages of the television receiver in system 19′ so as to be applied to the color picture tube and synchronizing circuits in conventional manner. For example, the output of 28*a*** is applied to the luminance channels while the outputs of the other detectors are delivered to the load circuits of the color demodulators.

The kind of television receiver which utilizes a luminance signal in combination with a pair of color difference signals to develop a tri-color image is described in detail in Television Engineering Handbook by Donald G. Fink, first edition, 1957, published by McGraw-Hill Book Co., Inc., with particular reference to the color video signals discussed in chapter 9.5. As also described in detail in that publication, various other color television reproduction systems have been devised and the system of FIG. 2 is readily adaptable to any such system in which a plurality of video channels are utilized to translate a corresponding plurality of video signals which together define the ultimate multi-color image. In one such system, for example, the image is represented by three primary color signals usually represented R, B and G for red, green and blue. In using that system, the three channels of FIG. 2 are individually assigned to those respective different color video signals.

Utilizing a spot size of 0.10 mil as the diameter of the spot developed upon recording medium **12*a*** by each of the three beams and a deflection range enabling the achievement of 400 resolvable spots in the horizontal direction across each of the individual images in a typical application the individual image has a horizontal dimenson of 0.040 inch and a vertical height of 0.030 inch. Corresponding with that size, the recording medium is moved at a speed of only 0.9 inch per second. By utilizing a strip of recording medium a little more than one-eighth of an inch wide, all three of the respective images are readily disposed in side-by-side relation while leaving room for an audio-recording area in addition.

Alternative to the use of a strip or ribbon of recording material, various other configurations known generally in the recording art may be employed. One such arrangement is depicted in FIG. 4 wherein the record is formed upon a disc 45 of the recording medium. Using the same 0.040 x 0.030 inch frame size as exemplified above, a 12-inch disc upon which is formed a single track spiraling inward to a 6-inch diameter, and allowing a 40 percent guard band between successive tracks, would need to rotate at only three revolutions per minute to record and play back information having a duration of fifteen minutes.

With a reasonable increase in sophistication of the FIG. 1 system so as to achieve more resolvable spots in the image and to enable high definition while insuring excellent phase tolerance, the entire composite color video signal, such as that developed in the NTCS system, may be recorded as a single series of image frames. The recording is a miniature picture observable directly through suitable magnification by the human eye, although as recorded it is in monochrome.

During operation in the reproduction mode, the developed electrical signal is fed to the television system where it is processed in the same way as a received composite video signal so as to divide it into its individual components for application to the remaining conventional portions of the color television receiver. For this mode of operation, however, it is necessary to control very accurately the horizontal rates both as to frequency and phase. To that end, the horizontal sync pulses in the video signal also are recorded and the system includes automatic frequency and phase control loops to insure such control. Systems for this purpose are the subject of the aforesaid Adler application.

As illustrated in each of the systems of FIGS. 1 and 2, the light is first modulated with video information and is then deflected while the recording strip is moved so as to define a raster. While this approach generally is preferably for convenience, that operational order may be reversed so that the light is first deflected to define the image lines and is then subjected to the video modulation.

The image recording portion of the apparatus is capable of being utilized in cooperation with other image pick-up techniques. For example, the user may employ a separate television-type camera to develop video signals of a live scene, as in the case of home movies, and such signals are then applied in the illustrated arrangement to operate light modulator 17. The result is like that of a conventional home movie system except that the usual projector is replaced by the television-type reproduction system described.

Each of the elements and components in the described systems may be entirely conventional in nature. Moreover, the different elements associated with the modulation, deflection and detection of the light beam may in themselves be of quite simple and compact construction. Consequently, their combination as explained results in a video recording and/or reproducing system of a compact, comparatively unsophisticated and inexpensive nature. The disclosed systems enable wide flexibility both as to nature and adaptation of use and as to the choice from among different available individual components and recording media. Significantly, the extremely small area per recorded field results in a substantial reduction in the amount of recording medium required for a given record. Moreover, the use of a laster beam enables an enormous increase in brightness of recording.

While particular embodiments of the present invention have been shown and described, it will be obvious to those skilled in the art that changes and modifications may be made without departing from the invention in its broader aspects. Accordingly, the aim in the appending claims is to cover all such changes and modifications as fall with the true spirit and scope of the invention.

I claim:

1. An electro-optical video recording and playback system for recording composite video signals derived from a television receiver and for subsequently playing back the recorded composite video signals through said television receiver, which system comprises:

laser means for developing a collimated beam of coherent optical radiation;

an optical modulator for varying the intensity of said beam in accordance with an applied signal;

means adapted to apply composite video signals from said television receiver to said optical modulator to effect intensity modulation of said beam in accordance therewith;

optical deflection means for repetitively deflecting said beam laterally in synchronism with said composite video signals;

a recording medium capable of recording images in response to incident optical radiation;

a transport mechanism for moving said medium transversely with respect to the direction of deflection of said beam;

means including an optical projection system for imaging the modulated and deflected beam onto said moving medium with a spot size large compared to that of a picture element to expose selected areas of said medium and record said composite video signals thereon;

means including said laser means and a photo-detector for reading the exposed areas of said medium with and unmodulated coherent light beam of a spot size comparable to that of a picture element to reconstitute said composite video signals;

and means for applying said reconstituted composite video signals to said television receiver.

2. An electro-optical video recording and playback system according to claim 1, which further includes means for switching said system between the recording and playback modes, and in which said switching means includes means for removing from the path of said coherent optical radiation during one of said modes a cylindrical optical lens element which is included in said path during said modes to establish the difference in light beam spot size for recording and playback.

3. An electro-optical video recording and playback system for recording composite video signals derived from a television receiver and for subsequently playing back the recorded composite video signals through said television receiver, which system comprises:

laser means for developing a collimated beam of coherent optical radiation;

an optical modulator for varying the intensity of said beam in accordance with an applied signal;

means adapted to apply composite video signals from said television receiver to said optical modulator to effect intensity modulation of said beam in accordance therewith;

optical deflection means for repetitively deflecting said beam laterally in synchronism with said composite video signals;

an opaque recording medium capable of recording images in response to incident optical radiation;

a transport mechanism for moving said medium transversely with respect to the direction of deflection of said beam;

means including an optical projection system for imaging the modulated and deflected beam onto said moving medium with a spot size large compared to that of a picture element to expose selected areas of said medium and record said composite video signals thereon;

means including said laser means and said optical deflection means for scanning the exposed areas of said medium with an unmodulated coherent light beam and a photo-detector for receiving a reflected light component from said recording medium to reconstitute said composite video signals;

and means for applying said reconstituted composite video signals to said television receiver.

4. An electro-optical video recording and playback system according to claim 3, in which the means for imaging the modulated recording beam and the means for reading exposed areas of the medium with an unmodulated playback beam include one or more common optical elements.

5. An electro-optical video recording and playback system for recording composite color video signals derived from a color television receiver and for subsequently playing back the recorded composite color video signals through said television receiver, which system comprises:

laser means for developing a plurality of collimated beams of coherent optical radiation;

a first optical modulator for varying the intensity of one of said beams in accordance with the luminance-signal component of said composite color video signals;

a second optical modulator for varying the intensity of another of said beams in accordance with a first color-difference-signal component of said composite color video signals;

a third optical modulator for varying the intensity of a third one of said beams in accordance with a second color-difference-signal component of said composite color video signals;

common optical deflection means for repetitively deflecting all of said beams laterally in synchronism with said composite color video signals;

a recording medium capable of recording images in response to incident optical radiation;

a transport mechanism for moving said medium transversely with respect to the direction of deflection of said optical beams;

optical means for imaging the modulated and deflected beams onto said moving medium to separately and respectively expose selected areas thereof for recording of said luminance-signal component and said color-difference-signal components of said composite color video signals, respectively;

means including separate photo-detectors for reading the respective exposed areas of said medium with a corresponding plurality of unmodulated coherent light beams to reconstitute said luminance-signal and color-difference-signal components of said composite color video signals;

and means for applying said reconstituted luminance-signal and color-difference-signal components of said composite color video signals to said television receiver for reproduction of a recorded color television image.

6. An electro-optical video recording and playback system for recording composite color video signals derived from a color television receiver and for subsequently playing back the recorded composite color video signals through said television receiver, which system comprises:

laser means for developing a plurality of collimated beams of coherent optical radiation;

a corresponding plurality of separate optical modulators for individually varying the intensity of one of said beams in accordance with different respective primary color image field components of said composite color video signals;

common optical deflection means for repetitively deflecting all of said beams laterally in synchronism with said composite color video signals;

a recording medium capable of recording images in response to incident optical radiation;

a transport mechanism for moving said medium transversely with respect to the direction of deflection of said optical beams;

optical means for imaging the modulated and deflected beams onto said moving medium to separately and respectively expose selected areas thereof for recording of said primary color image field components of said composite color video signals thereon;

means including separate photo-detectors for reading the respective exposed areas of said medium with a corresponding plurality of unmodulated coherent light beams to reconstitute said primary color image field components of said composite color video signals;

and means for applying said reconstituted primary color image field components of said composite color video signals to said television receiver for reproduction of a recorded color television image.

References Cited

UNITED STATES PATENTS

| | | | |
|---|---|---|---|
| 3,175,196 | 3/1965 | Lee et al. | 340—173 |
| 3,234,326 | 2/1966 | Goldmark et al. | 178—6.7 |
| 3,290,437 | 12/1966 | Goldmark et al. | 178—6.7 X |
| 3,314,073 | 4/1967 | Becker | 346—76 |
| 3,324,478 | 6/1967 | Jacobs | 346—108 |
| 3,335,219 | 8/1967 | Goldmark et al. | 178—6.7 |
| 3,361,873 | 1/1968 | Johnson et al. | 178—6.7 |
| 3,438,050 | 4/1969 | Aschenbrenner et al. | 346—49 |

RICHARD MURRAY, Primary Examiner

R. K. ECKERT, Jr., Assistant Examiner

U.S. Cl. X.R.

178—6.6; 346—76